United States Patent
Zhou et al.

(10) Patent No.: US 12,143,843 B2
(45) Date of Patent: Nov. 12, 2024

(54) METHOD AND APPARATUS FOR DETERMINING PDCCH MONITORING OCCASION, STORAGE MEDIUM, TERMINAL, AND BASE STATION

(71) Applicant: SPREADTRUM COMMUNICATIONS (SHANGHAI) CO., LTD., Shanghai (CN)

(72) Inventors: Huayu Zhou, Shanghai (CN); Zhikun Xu, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 487 days.

(21) Appl. No.: 17/599,905

(22) PCT Filed: Mar. 5, 2020

(86) PCT No.: PCT/CN2020/077913
§ 371 (c)(1),
(2) Date: Sep. 29, 2021

(87) PCT Pub. No.: WO2020/199839
PCT Pub. Date: Oct. 8, 2020

(65) Prior Publication Data
US 2022/0201520 A1    Jun. 23, 2022

(30) Foreign Application Priority Data
Mar. 29, 2019    (CN) .......................... 201910250621.8

(51) Int. Cl.
*H04W 24/08* (2009.01)
*H04W 56/00* (2009.01)
(Continued)

(52) U.S. Cl.
CPC .......... *H04W 24/08* (2013.01); *H04W 56/001* (2013.01); *H04W 72/046* (2013.01); *H04W 72/23* (2023.01)

(58) Field of Classification Search
CPC . H04W 24/08; H04W 56/001; H04W 72/046; H04W 72/23; H04W 56/0015;
(Continued)

(56) References Cited

U.S. PATENT DOCUMENTS

2016/0057738 A1    2/2016    Lee et al.
2019/0253308 A1*   8/2019    Huang ................ H04L 43/0823
(Continued)

FOREIGN PATENT DOCUMENTS

CN    108012329 A    5/2018
CN    109309950 A    2/2019
(Continued)

OTHER PUBLICATIONS

International Search Report for corresponding International Application No. PCT/CN2020/077913; Date of Mailing: May 22, 2020.
(Continued)

*Primary Examiner* — Nizam U Ahmed
(74) *Attorney, Agent, or Firm* — CANTOR COLBURN LLP

(57) ABSTRACT

A method and an apparatus for determining a PDCCH monitoring occasion, a storage medium, a terminal, and a base station are provided, the method includes: acquiring an i-th PDCCH monitoring occasion corresponding to the synchronization signal block with the index of K based on a predefined association relationship, in response to detecting a synchronization signal block with an index of K, wherein the PDCCH monitoring occasion has the predefined association relationship with the synchronization signal block, wherein i represents an index of a candidate position of the
(Continued)

acquiring an i-th PDCCH monitoring occasion corresponding to the synchronization signal block with the index of K based on a predefined association relationship, in response to detecting a synchronization signal block with an index of K — S11 determining an intra-QCL-subgroup index of the synchronization signal block with the index of K where the synchronization signal block with the index of K is located in — S12 determining a redundant version of a PDSCH scheduled by the i-th PDCCH based on the intra-QCL-subgroup index — S13

PDCCH monitoring occasion, K represents an index of the synchronization signal block, or a beam index of the synchronization signal block, or an intra-group index of the synchronization signal block, or an intra-group index of a candidate position of the synchronization signal block.

19 Claims, 2 Drawing Sheets

(51) Int. Cl.
*H04W 72/044* (2023.01)
*H04W 72/23* (2023.01)

(58) Field of Classification Search
CPC ...... H04W 68/02; H04B 7/0695; H04L 5/005; H04L 5/0053
See application file for complete search history.

(56) References Cited

U.S. PATENT DOCUMENTS

2019/0313428 A1* 10/2019 Zhou .............. H04L 27/2602
2022/0263618 A1* 8/2022 Harada .............. H04J 11/0076

FOREIGN PATENT DOCUMENTS

| CN | 109391971 A | 2/2019 |
|---|---|---|
| CN | 109451848 A | 3/2019 |
| CN | 109560904 A | 4/2019 |
| CN | 110535542 A | 12/2019 |
| CN | 110692275 A | 1/2020 |
| EP | 3451553 A2 | 3/2019 |
| WO | 2017171454 A1 | 10/2017 |

OTHER PUBLICATIONS

KIPO Request for the Submission of an Opinion for corresponding KR Application No. 10-2021-7035094; dated Feb. 1, 2023.
Samsung Electronics, "Extended PO for Paging in NR-U", 3GPP TSG-RAN2 105bis, R2-1903107, Apr. 8-12, 2019, 3 pages.
Spreadtrum Communications, "Discussion on initial access and mobility in NR-U", 3GPP TSG RAN WG1 Meeting #96, R1-1902737, Feb. 25-Mar. 1, 2019, 16 pages.
EPO Extended European Search Report for corresponding EP Application No. 20782318.8; Issued on Nov. 30, 2022.
Fujitsu, "Enhancements to initial access procedure and scheduling request procedure for NR-U", 3GPP TSG RAN WG1 Ad-Hoc Meeting 1901, R1-1900244, Jan. 21-25, 2019, 7 pages.
Huawei et al., "Discussion to clarify the relationship between OSI monitor occasion and SSB", 3GPP TSG-RAN WG2 Meeting #103bis, R2-1815069, Oct. 8-12, 2018, 4 pages.
Huawei et al., "UE power saving paging", 3GPP TSG RAN WGl Ad-Hoc Meeting 1901, R1-1901244, Jan. 21-25, 2019, 6 pages.
JPO Notice of Reasons for Refusal for corresponding JP Application No. 2021-557701; Issued on Oct. 7, 2022.
Nokia et al., "Initial Access Signals and Channels for NR-U", 3GPP TSG RAN WG1 Meeting #AH-1901, R1-1900347, Jan. 21-25, 2019, 24 pages.
Nokia et al., "On issues related to DL signals and channels", 3GPP TSG-RAN WG1 meeting #94bis, R1-1811474, Oct. 8-12, 2018, 12 pages.
RAN2 Chairman (Intel) , "Chairman Notes", 3GPP Draft TSG-RAN WG2 Meeting #103bis, R2-1815990 Addition of Ran Specific Access Category; Oct. 8-12, 2018, 135 pages.
Spreadtrum Communications, "Discussion on initial access and mobility in NR-U", 3GPP TSG RAN WG1 Ad-Hoc Meeting 1901, R1-1900721, Jan. 21-25, 2019, 15 pages.
Spreadtrum Communications, "Discussion on initial access in NR-U", 3GPP TSG RAN WG1 Meeting #95, R1-1813078, Nov. 12-16, 2018, 7 pages.
CNIPA First Office Action for corresponding CN Application No. 201910250621.8; Issued Dec. 23, 2021.
NTT Docomo, Inc. "Summary for PDCCH structure and search space"; 3GPP TSG RAN WG1 Meeting #96; R1-193339; Feb. 25-Mar. 1, 2019; 18 pages.

* cited by examiner

METHOD AND APPARATUS FOR DETERMINING PDCCH MONITORING OCCASION, STORAGE MEDIUM, TERMINAL, AND BASE STATION

CROSS-REFERENCE TO RELATED APPLICATIONS

This application is the national stage of International Application No. PCT/CN2020/077913, filed on Mar. 5, 2020. Priority under 35 U.S.C. § 119(a) and 35 U.S.C. § 365(b) is claimed from Chinese Patent Application No. 201910250621.8, filed on Mar. 29, 2019, and entitled "METHOD AND APPARATUS FOR DETERMINING PDCCH MONITORING OCCASION, STORAGE MEDIUM, TERMINAL, AND BASE STATION", the entire content of which is incorporated herein by reference.

TECHNICAL FIELD

The present disclosure generally relates to communication technology field, and more particularly, to a method and apparatus for determining PDCCH monitoring occasion, storage medium, terminal and base station.

BACKGROUND

In the 5G system, a synchronization signal and a broadcast channel are transmitted in a form of a synchronization signal block. There is a primary synchronization signal (Primary Synchronization Signal, PSS), a secondary synchronization signal (Secondary Synchronization Signal, SSS), and a physical broadcast channel (Physical Broadcast Channel, PBCH) in the synchronization signal block (Synchronization Signal Block, SS/PBCH block, SSB).

In the conventional technology, the time domain positions of L synchronization signal blocks within a 5 ms window are fixed. The indexes of the L synchronization signal blocks, from 0 to L−1, are arranged consecutively with regard to the time domain positions. Therefore, the transmission time of each of the synchronization signal blocks within this 5 ms window is fixed, and the index thereof is also fixed.

Regarding the monitoring occasion of a paging physical downlink control channel (Physical Downlink Control Channel, PDCCH), in Rel-15 New Radio (NR), the paging occasion (Paging Occasion, PO) for a given UE is composed of a plurality of Paging PDCCH monitoring occasions. Within one PO, the Paging PDCCH may be transmitted by beam-scanning as the synchronization signal block. Within one PO, the monitoring occasion of the Paging PDCCH has one-to-one correspondence to the synchronization signal block, that is, within one PO, the monitoring occasion of the K-th Paging PDCCH corresponds to the K-th synchronization signal block.

In the NR unlicensed spectrum, the power spectrum density (Power Spectrum Density, PSD) and/or the effective isotropic radiated power (Effective Isotropic Radiated Power, EIRP) are limited, thus it may not be an effective way to transmit broadcast-type information (including Paging) through a narrow beam. Instead, it may be more effective to transmit the broadcast-type information through a wide beam or in an omnidirectional manner. When the broadcast-type information is transmitted through a wide beam or in an omnidirectional manner, how to improve the reception performance and efficiency of the broadcast-type information is an urgent problem to be solved.

There is an urgent need for a method for determining PDCCH monitoring occasion, which can effectively improve the reception performance and efficiency of the broadcast-type information in the NR unlicensed spectrum, when the broadcast-type information is transmitted through a wide beam or in an omnidirectional manner.

SUMMARY

Embodiments in the present disclosure provide a method and apparatus for determining PDCCH monitoring occasion, a storage medium, a terminal, and a base station, which can effectively improve the reception performance and efficiency of broadcast-type information.

In an embodiment of the present disclosure, a method for determining PDCCH monitoring occasion is provided. The method includes: acquiring an i-th PDCCH monitoring occasion corresponding to the synchronization signal block with the index of K based on a predefined association relationship, in response to detecting a synchronization signal block with an index of K, wherein the PDCCH monitoring occasion has the predefined association relationship with the synchronization signal block, wherein i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block.

In an embodiment of the present disclosure, an apparatus for determining PDCCH monitoring occasion is provided. The apparatus includes: a first monitoring occasion determination circuitry, configured to: acquire an i-th PDCCH monitoring occasion corresponding to the synchronization signal block with the index of K based on a predefined association relationship, in response to detecting a synchronization signal block with an index of K, wherein the PDCCH monitoring occasion has the predefined association relationship with the synchronization signal block, i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block.

In an embodiment of the present disclosure, a non-transitory storage medium storing one or more programs, the one or more programs comprising computer instructions, which, when executed by a processor, cause the processor to: acquiring an i-th PDCCH monitoring occasion corresponding to the synchronization signal block with the index of K based on a predefined association relationship, in response to detecting a synchronization signal block with an index of K, wherein the PDCCH monitoring occasion has the predefined association relationship with the synchronization signal block, wherein i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block.

DETAILED DESCRIPTION

As described in background, there is a need for a method for determine PDCCH monitoring occasion when broadcast-type information is transmitted through a wide beam or in an omnidirectional manner in the conventional NR unlicensed spectrum.

In an embodiment of the present disclosure, based on a predefined association relationship between the PDCCH monitoring occasion and the synchronization signal block, it may be acquired, when a synchronization signal block with an index of K is detected, an i-th PDCCH monitoring occasion corresponding to the synchronization signal block with the index of K based on the predefined association relationship, thereby effectively improving the reception performance and efficiency of broadcast-type information when the broadcast-type information is transmitted through a wide beam or in an omnidirectional manner.

In order to clarify the object, characteristic and advantages of embodiments of the present disclosure, the embodiments of present disclosure will be described clearly in detail in conjunction with accompanying drawings.

Figure 1:
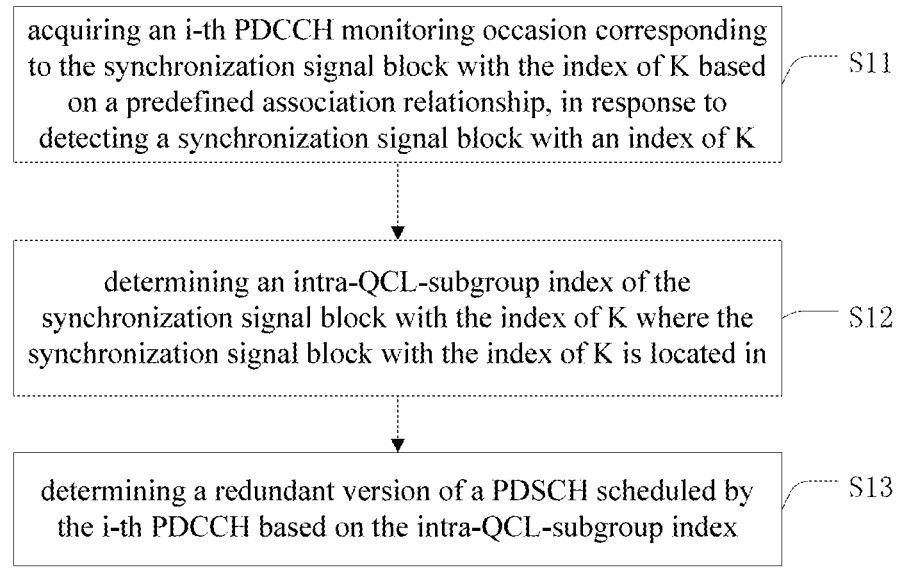
FIG. 1 is a flowchart of a method for determining PDCCH monitoring occasion according to an embodiment of the present disclosure.

Referring to FIG. 1, FIG. 1 is a flowchart of a method for determining PDCCH monitoring occasion according to an embodiment of the present disclosure.

The method for determining the PDCCH monitoring occasion may be applied to a terminal (User Equipment, UE) side. The method may include S11, and may also include S11 to S13.

In S11, acquiring an i-th PDCCH monitoring occasion corresponding to the synchronization signal block with the index of K based on a predefined association relationship, in response to detecting a synchronization signal block with an index of K.

The PDCCH monitoring occasion has the predefined association relationship with the synchronization signal block, i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block.

Generally, in a synchronization signal block transmission window or a discovery reference-signal transmission window (Discovery Reference-Signal transmission window, DRS transmission window), candidate positions of synchronization signal blocks may be divided into one or more groups, and there is one or more synchronization signal blocks in each group. For example, in the synchronization signal block transmission window or the DRS transmission window, there are candidate positions of 16 synchronization signal blocks. The 16 synchronization signal blocks may be divided into 4 groups each having 4 synchronization signal blocks. If i1 is denoted as the candidate position of the synchronization signal block, K is denoted as an intra-group index of the synchronization signal block, S is denoted as a maximum value of K or the number of synchronization signal blocks in the synchronization signal block group, and c is denoted as an inter-group index of the synchronization signal block, then i1=S×c+K. For example, in the synchronization signal block transmission window or the DRS transmission window, there are candidate positions of 16 synchronization signal blocks, and the 16 synchronization signal blocks may be divided into 4 groups each having 4 synchronization signal blocks, then 0≤c<4, S=4, and 0≤i1<16. In a case of i1=10, correspondingly, c=2 and K=2.

Specifically, quasi co-located (Quasi Co-Located, QCLed) synchronization signal blocks, or synchronization signal blocks having a quasi co-location (Quasi Co-Location, QCL) relationship, or synchronization signal blocks with the same QCL property are transmitted through a same beam. QCLed PDCCHs, or PDCCHs having a QCL relationship, or PDCCHs having a same QCL property are transmitted through a same beam. Conversely, non-QCLed synchronization signal blocks are transmitted through different beams, and non-QCLed PDCCHs are transmitted through different beams.

Generally, a synchronization signal block group may be divided into one or more QCL subgroups each having one or more synchronization signal blocks, the one or more synchronization signal blocks having QCL relationship. For example, a synchronization signal block group has 4 synchronization signal blocks, which may be divided into 2 QCL subgroups, and each QCL subgroup has 2 synchronization signal blocks. If K is denoted as an intra-group index of the synchronization signal block, q is denoted as an inter-QCL-subgroup index, wherein the inter-QCL-subgroup index is an index among a QCL subgroups, P is denoted as the number of synchronization signal blocks in the QCL subgroup, and M is an intra-QCL-subgroup index, wherein the intra-QCL-subgroup index is an index in a QCL subgroup. then K=P×q+M. For example, a synchronization signal block group has 4 synchronization signal blocks, which may be divided into 2 QCL subgroups, and each QCL subgroup has 2 synchronization signal blocks, then 0≤q<2, P=2, and 0≤K<4. In a case of K=2, correspondingly, q=1 and M=0. For another example, a synchronization signal block group has 4 synchronization signal blocks, which may be divided into 4 QCL subgroups, and each QCL subgroup has 1 synchronization signal block, then 0≤q<1, P=4, and 0≤K<4. In a case of K=2, correspondingly, q=0 and M=2.

The terminal assumes that if there is a QCL relationship among synchronization signal blocks corresponding to several PDCCH monitoring occasions, then PDSCHs scheduled by these PDCCHs uses a series of preset redundant versions (Redundant Version, RV). Generally, if there is a QCL relationship among the synchronization signal blocks corresponding to several PDCCH monitoring occasions, then there is also a QCL relationship among these several PDCCH monitoring occasions. At this time, the PDSCHs scheduled by these PDCCHs are transmitted through a same beam, and thus use a series of RVs. The UE can obtain a higher diversity gain by chasing combining or HARQ combining, compared to the simple repeated transmission of one RV by a base station.

The PDSCHs scheduled by the PDCCHs use a series of RVs in sequence. For example, the series of RVs are RV0, RV2, and RV1 successively, and then the PDSCHs scheduled by the PDCCHs use RV0, RV2, and RV1 in sequence.

In an embodiment of the present disclosure, the number of non-QCLed PDCCH monitoring occasions may be equal to the number of non-QCLed synchronization signal blocks.

In a specific implementation of an embodiment of the present disclosure, UE may assume that S is denoted as the number or the maximum number of PDCCH monitoring occasions that are actually transmitted, and there is a one-to-one association relationship between the synchronization signal block and the PDCCH monitoring occasion, then S may also be the number or maximum number of synchronization signal blocks that are actually transmitted.

Further, the predefined association relationship may be represented as $i=S \times x+K$;

x represents an inter-group index of the candidate position of the PDCCH monitoring occasion, x is an integer, and $0 \leq x < X$, and S represents the maximum value of K, or the number of synchronization signal blocks in the synchronization signal block group, or the number or maximum number of synchronization signal blocks that are actually transmitted.

Based on the above association relationship, i may be calculated from K. On the other hand, K may be derived from i based on the above association relationship. K may be obtained by performing a circuitry S operation on i, or by dividing S into i to obtain a remainder. Further, the X may be a positive integer, and X is received from a base station or is predefined.

Specifically, S×X PDCCH monitoring occasions may constitute a PDCCH monitoring occasion window.

More specifically, a PDCCH monitoring occasion window is a set of S×X PDCCH monitoring occasions. The set includes X PDCCH monitoring occasion groups, and each of the PDCCH monitoring occasion groups includes S PDCCH monitoring occasions. The PDCCH monitoring occasions in a PDCCH monitoring occasion window may be formed as follows. Starting from the first PDCCH monitoring occasion in a certain window, PDCCH monitoring occasions that do not overlap with an uplink (UL) symbol are sequentially numbered, and the numbering starts from zero.

Generally, a PDCCH monitoring occasion window includes candidate positions of S×X PDCCH monitoring occasions. The S×X PDCCH monitoring occasions may be divided into X groups, and each group has S PDCCH monitoring occasions having a one-to-one association relationship with S synchronization signal blocks. When UE detects a certain synchronization signal block, the UE may derive, based on the one-to-one association relationship, a PDCCH monitoring occasion associated with the synchronization signal block, and monitor the PDCCH monitoring occasion. Such one-to-one association relationship is simple, easy to be implemented by a base station and a UE, and can save signaling overheads.

Specifically, S×X PDCCH monitoring occasions may constitute a paging occasion.

More specifically, a PO is a set of S×X paging PDCCH monitoring occasions, the set includes X paging PDCCH monitoring occasion groups, and each of the paging PDCCH monitoring occasion groups includes S paging PDCCH monitoring occasions. The paging PDCCH monitoring occasions in a PO may be formed as follows. Starting from the first PDCCH monitoring occasion in the PF, PDCCH monitoring occasions that do not overlap with the uplink (UL) symbol are sequentially numbered, and the numbering starts from zero.

Generally, one PO includes candidate positions of S×X paging PDCCH monitoring occasions. The S×X paging PDCCH monitoring occasions may be divided into X groups, and each group has S paging PDCCH monitoring occasions having a one-to-one association relationship with S synchronization signal blocks. When UE detects a certain synchronization signal block, the UE may derive, based on the one-to-one association relationship, a PDCCH monitoring occasion associated with the synchronization signal block, and monitor the PDCCH monitoring occasion. Such one-to-one association relationship is simple, easy to be implemented by a base station and a UE, and can save signaling overheads.

The $(S \times x+K)$-th PDCCH monitoring occasion corresponds to (associates with) the K-th transmitted synchronization signal block, where x is an inter-group index of the PDCCH monitoring occasion, and x=0, 1, . . . X−1, K is an intra-group index of PDCCH monitoring occasion, and K=1, 2, . . . S or K=0, 1, . . . S−1.

Furthermore, S being the number or maximum number of the synchronization signal blocks that are actually transmitted may be received from a base station or is predefined.

An example of S=4 and paging PDCCH is illustrated as follows.

It may be determined 4 SSBs, namely A0, A1, A2, A3, and 8 candidate paging PDCCH monitoring occasions, namely P0, P1, P2, P3, P4, P5, P6, P7. Then UE may determine K based on the association relationship.

Specifically, $i=4 \times x+K$, where x=0, 1, and K=0, 1, 2, 3. A specific association relationship is obtained as follows: A0 is associated with P0, A1 is associated with P1, A2 is associated with P2, A3 is associated with P3, A0 is associated with P4, A1 is associated with P5, A2 is associated with P6, and A3 is associated with P7.

Furthermore, the UE may determine an intra-QCL-subgroup index, based on the predefined association relationship between an index K of the synchronization signal block and the intra-QCL-subgroup index.

Specifically, A0 and A2 constitute a QCL subgroup, and intra-QCL-subgroup indexes of A0 and A2 are 0 and 1 respectively. A1 and A3 constitute a QCL subgroup, and intra-QCL-subgroup indexes of A1 and A3 are 0 and 1 respectively.

Then, the UE may determine a redundant version of a paging PDSCH scheduled by the associated paging PDCCH.

Specifically, the redundant versions of the paging PDSCHs scheduled by the paging PDCCHs associated with A0 and A2 are RV0 and RV1, respectively; the redundant versions of the paging PDSCHs scheduled by the paging PDCCHs associated with A1 and A3 are RV0 and RV1, respectively. That is, the redundant version of the paging PDSCHs scheduled by the paging PDCCHs on P0 and P4 associated with A0 is RV0, and the redundant version of the paging PDSCHs scheduled by the paging PDCCHs on P2 and P6 associated with A2 is RV1, the redundant version of the paging PDSCHs scheduled by the paging PDCCHs on P1 and P5 associated with A1 is RV0, and the redundant version of the paging PDSCHs scheduled by the paging PDCCHs on P3 and P7 associated with A3 is RV1.

Then, the UE may perform decoding.

In another specific implementation of an embodiment of the present disclosure, the UE may obtain the number or the maximum number S' of PDCCH monitoring occasions that are actually transmitted by receiving an instruction from a base station, and the UE derives that there is an N-to-1 association relationship between the synchronization signal block and the PDCCH monitoring occasions, where N=S/S'. Alternatively, the UE may obtain that there is an N-to-1 association relationship between the synchronization signal block and the PDCCH monitoring occasions by receiving an instruction from the base station, and the UE derives the number or maximum number S' of PDCCH monitoring occasions that are actually transmitted to be equal to S/N.

Further, the predefined association relationship may be represented as $i=S' \times x+K'$;

x represents an inter-group index of the candidate position of the PDCCH monitoring occasion, and $0 \leq x \leq X$, and K' represents an index of the PDCCH monitoring occasion, or a beam index of the PDCCH monitoring occasion, or an intra-group index of the candidate location of the PDCCH monitoring occasion, and S' represents a maximum value of K', or the number or maximum number of PDCCH monitoring occasions that are actually transmitted.

Based on the above association relationship, i may be calculated from K'. On the other hand, K' may be derived from i based on the above association relationship. K may be obtained by performing a modulo S' operation on i, or by dividing S' into i to obtain a remainder.

Further, the X may be a positive integer, and X is received from a base station or is predefined.

Further, S' being the number or maximum number of PDCCH monitoring occasions that are actually transmitted may be received from the base station or predefined.

Further, the association relationship between K' and K may be received from the base station or predefined.

Specifically, the association relationship between K' and K may include: K' is an intra-QCL-subgroup index of the K-th synchronization signal block.

Specifically, S'×X PDCCH monitoring occasions may constitute a PDCCH monitoring occasion window.

More specifically, a PDCCH monitoring occasion window is a set of S'×X PDCCH monitoring occasions. The set includes X PDCCH monitoring occasion groups, and each of the PDCCH monitoring occasion groups includes S' PDCCH monitoring occasions. The PDCCH monitoring occasions in a PDCCH monitoring occasion window may be formed as follows. Starting from the first PDCCH monitoring occasion in a certain window, PDCCH monitoring occasions that do not overlap with an uplink (UL) symbol are sequentially numbered, and the numbering starts from zero.

Generally, a PDCCH monitoring occasion window includes candidate positions of S'×X PDCCH monitoring occasions. The S'×X PDCCH monitoring occasions may be divided into X groups, and each group has S' PDCCH monitoring occasions having a one-to-N association relationship with S synchronization signal blocks, where N=S/S'. When UE detects a certain synchronization signal block, the UE may derive, based on the one-to-N association relationship, a PDCCH monitoring occasion associated with the synchronization signal block, and monitor the PDCCH monitoring occasion. The advantage of such one-to-multi association relationship is as follows. N synchronization signal blocks may have QCL relationship, which is equivalent to N synchronization signal blocks being repeatedly transmitted through a same beam, also referred to as beam repetition, such that the UE performs soft combining when receiving synchronization signal blocks to improve performance. However, repetitive transmission of PDCCH/PDSCH by a base station with the UE performing simple soft combining may not have a performance as good as non-repetitive transmission. That is, the base station aggregates N resources into one resource, and transmits a PDCCH/PDSCH with a low code rate. The PDCCH/PDSCH with a low code rate can obtain a higher channel coding gain. Specifically, S'×X PDCCH monitoring occasions may constitute a paging occasion.

More specifically, a PO is a set of S'×X paging PDCCH monitoring occasions, the set includes X paging PDCCH monitoring occasion groups, and each of the paging PDCCH monitoring occasion groups includes S' paging PDCCH monitoring occasions. The paging PDCCH monitoring occasions in a PO may be formed as follows. Starting from the first PDCCH monitoring occasion in the PF, PDCCH monitoring occasions that do not overlap with the uplink (UL) symbol are sequentially numbered, and the numbering starts from zero.

Generally, one PO includes candidate positions of S'×X paging PDCCH monitoring occasions. The S'×X paging PDCCH monitoring occasions may be divided into X groups, and each group has S' paging PDCCH monitoring occasions having a one-to-N association relationship with S synchronization signal blocks, where N=S/S'. When UE detects a certain synchronization signal block, the UE may derive, based on the one-to-N association relationship, a paging PDCCH monitoring occasion associated with the synchronization signal block, and monitor the paging PDCCH monitoring occasion. The advantage of such one-to-multi association relationship is as follows. N synchronization signal blocks may have QCL relationship, which is equivalent to N synchronization signal blocks being repeatedly transmitted through a same beam, also referred to as beam repetition, such that the UE performs soft combining when receiving synchronization signal blocks to improve performance. However, repetitive transmission of paging PDCCH/PDSCH by a base station with the UE performing simple soft combining may not have a performance as good as non-repetitive transmission. That is, the base station aggregates N resources into one resource, and transmits a paging PDCCH/PDSCH with a low code rate. The paging PDCCH/PDSCH with a low code rate can obtain a higher channel coding gain.

The (S'×x+K')-th PDCCH monitoring occasion associates with the K'-th transmitted synchronization signal block, where x is an inter-group index of the PDCCH monitoring occasion, and x=0, 1, . . . , X−1, K' is an intra-group index of PDCCH monitoring occasion, and K'=1, 2, . . . S' or K=0, 1, . . . , S'−1.

An example of S=4, S'=2 and paging PDCCH is illustrated as follows.

It may be determined 4 SSBs, namely A0, A1, A2, A3, and 8 candidate paging PDCCH monitoring occasions, namely P0, P1, P2, P3, P4, P5, P6, P7. Then UE may determine K' based on the association relationship.

Specifically, i=2*x+K', where x=0, 1, 2, 3, and K'=0, 1. A specific association relationship is obtained as follows: A0 and A2 associate with P0, A1 and A3 associate with P1, A0 and A2 associate with P2, A1 and A3 associate with P3, A0 and A2 associate with P4, A1 and A3 associate with P5, A0 and A2 associate with P6, and A1 and A3 associate with P7.

Furthermore, the UE may determine an intra-QCL-subgroup index in the QCL subgroup, based on the predefined association relationship between an index K of the synchronization signal block and the intra-QCL-subgroup index in the QCL subgroup.

Specifically, A0 and A2 constitute a QCL subgroup, and intra-QCL-subgroup indexes of A0 and A2 are 0 and 1 respectively. A1 and A3 constitute a QCL subgroup, and intra-QCL-subgroup indexes of A1 and A3 are 0 and 1 respectively.

Then, the UE may determine a redundant version of a paging PDSCH scheduled by the associated paging PDCCH.

Specifically, the redundant version of the paging PDSCHs scheduled by the paging PDCCHs associated with A0 and A2 is RV0; the redundant version of the paging PDSCHs scheduled by the paging PDCCHs associated with A1 and A3 is RV1. That is, the redundant version of the paging PDSCHs scheduled by the paging PDCCHs on P0, P2, P4 and P6 associated with A0 and A2 is RV0, and the redundant version of the paging PDSCHs scheduled by the paging PDCCHs on P1, P3, P5 and P7 associated with A1 and A3 is RV1.

Then, the UE may perform decoding.

In an embodiment of the present disclosure, the predefined association relationship has a plurality of settings, thus to more effectively meet demands.

In a specific implementation of S12, the UE may determine an intra-QCL-subgroup index of the synchronization signal block with an index of K.

Further, said determining an intra-QCL-subgroup index of the synchronization signal block with an index of K in a QCL subgroup may include: obtaining, based on the predefined association relationship, an intra-QCL-subgroup index of the synchronization signal block with the index of K in a synchronization signal block subgroup where the synchronization signal block with the index of K is located in and in which synchronization signal blocks have QCL relationship.

Furthermore, the predefined association relationship may be represented as K=P×q+M;
P is the number of synchronization signal blocks in the QCL subgroup corresponding to the synchronization signal block, q represents an inter-QCL-group index corresponding to the synchronization signal block, and M represents an intra-index of the synchronization signal block in the QCL subgroup.

The q may be an integer, and 0≤q<Q. The Q may be a positive integer, and Q may be received from the base station or predefined. Q may represent the number of non-QCLed synchronization signal blocks.

Based on the above association relationship, K may be calculated from M. On the other hand, M may be derived from K based on the above association relationship. M may be obtained by performing a modulo P operation on K, or by dividing P into K to obtain a remainder.

Furthermore, the predefined association relationship may be represented as i1=S×c+K=S×c+P×q+M;
i1 represents an index of a candidate position of the synchronization signal block, S represents the maximum value of K, or the number of synchronization signal blocks in the synchronization signal block group, or the number or maximum number of synchronization signal blocks that are actually transmitted, and c represents an inter-group index of the candidate position of the synchronization signal block.

The c may be an integer, and 0≤c<C. The C may be a positive integer, and C may be received from the base station or predefined.

Based on the above association relationship, K may be calculated from M. On the other hand, M may be derived from it based on the above association relationship. M may be obtained by performing a modulo P operation on i1, or by dividing P into i1 to obtain a remainder. Generally, S is an integer multiple of P, that is, the number or maximum number of synchronization signal blocks that are actually transmitted is an integer multiple of the number of synchronization signal blocks in the QCL subgroup corresponding to the synchronization signal block. Therefore, the modulo P operation performed on it or the operation of dividing P into it to obtain the remainder, is equivalent to the modulo P operation performed on P×q+M (that is, K), or the operation of dividing P into K to obtain the remainder. In a specific implementation of S13, the UE may determine a redundant version of the PDSCH scheduled by the i-th PDCCH, based on the intra-QCL-subgroup index.

In an embodiment of the present disclosure, based on the predefined association relationship between the PDCCH monitoring occasion and the synchronization signal block, it may be acquired, when a K-th synchronization signal block is detected, an i-th PDCCH monitoring occasion corresponding to the QCL subgroup where the K-th synchronization signal block is located in based on the predefined association relationship, thereby effectively improving the reception performance and efficiency of broadcast-type information when the broadcast-type information is transmitted through a wide beam or in an omnidirectional manner.

Further, there is a QCL relationship between the synchronization signal block with an index of K and a PDCCH monitoring occasion with an index of a candidate position being equal to i.

Further, the PDCCH monitoring occasion may include: monitoring occasion of Type2-PDCCH or paging PDCCH or Type0-PDCCH or Type0A-PDCCH or Type1-PDCCH.

Further, the PDCCH monitoring occasion may include monitoring occasion of any common control channel or a PDCCH monitoring occasion corresponding to a common search space.

Reference is made to Table 1, which shows an example of the ratio value N being equal to S/S', where S'=Q.

TABLE 1

| S | S' | N = S/S' |
|---|----|----------|
| 8 | 1  | 8        |
|   | 2  | 4        |
|   | 4  | 2        |
|   | 8  | 1        |
| 7 | 7  | 1        |
|   | 7  | 1        |
| 6 | 1  | 6        |
|   | 2  | 3        |
|   | 3  | 2        |
|   | 6  | 1        |
| 5 | 5  | 1        |
|   | 5  | 1        |
| 4 | 1  | 4        |
|   | 2  | 2        |
|   | 4  | 1        |
| 3 | 3  | 1        |
|   | 3  | 1        |
| 2 | 1  | 2        |
|   | 2  | 1        |
| 1 | 1  | 1        |

Figure 2:
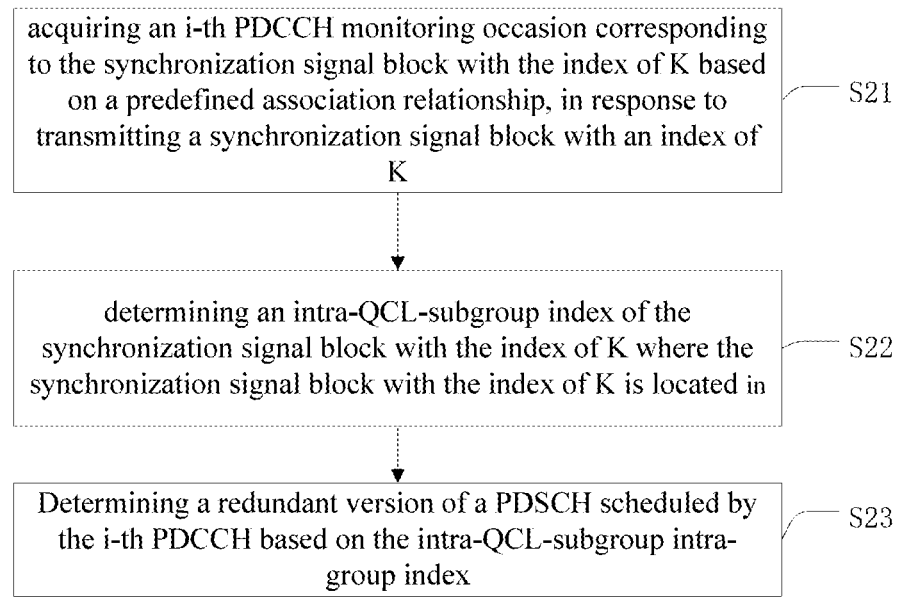
FIG. 2 is a flowchart of a method for determining PDCCH monitoring occasion according to another embodiment of the present disclosure.

Referring to FIG. 2, FIG. 2 is a flowchart of a method for determining PDCCH monitoring occasion according to another embodiment of the present disclosure.

The method for determining the PDCCH monitoring occasion may be applied to a station side. The method may include only S21, and may also include S21 to S23. The following is an illustration of S21, S22 and S23.

In S21, acquiring an i-th PDCCH monitoring occasion corresponding to the synchronization signal block with the index of K based on a predefined association relationship, in response to transmitting a synchronization signal block with an index of K.

The PDCCH monitoring occasion has the predefined association relationship with the synchronization signal block, i represents an index of a candidate position of the PDCCH monitoring occasion, K represents an intra-group index of the synchronization signal block, or a beam index of the synchronization signal block, or an intra-group index of the synchronization signal block, or an intra-group index of a candidate position of the synchronization signal block.

In a specific implementation of the embodiment of the present disclosure, the predefined association relationship may be represented as $i=S\times x+K$. x represents an inter-group index of the candidate position of the PDCCH monitoring occasion, and S represents the maximum value of K, or the number of synchronization signal blocks in a synchronization signal block group, or the number or maximum number of synchronization signal blocks that are actually transmitted.

Further, S being the number or maximum number of synchronization signal blocks that are actually transmitted may be transmitted to a terminal or predefined.

In a specific implementation of the embodiment of the present disclosure, the predefined association relationship may be represented as $i=S\times x+K$; x represents an inter-group index of the candidate position of the PDCCH monitoring occasion, and S represents the maximum value of K, or the number of synchronization signal blocks in the synchronization signal block group, or the number or maximum number of synchronization signal blocks that are actually transmitted.

Further, S being the number or maximum number of synchronization signal blocks that are actually transmitted may be transmitted to a terminal or predefined.

Further, x representing the inter-group index of the candidate position of the PDCCH monitoring occasion is an integer, and $0 \le x < X$, and the X is transmitted to the terminal or predefined.

Further, S×X PDCCH monitoring occasions may constitute a PDCCH monitoring occasion window or a paging occasion.

In a specific implementation of the embodiment of the present disclosure, the predefined association relationship may be represented as $i=S'\times x+K'$; x represents an inter-group index of the candidate position of the PDCCH monitoring occasion, and K' represents an index of the PDCCH monitoring occasion, or a beam index of the PDCCH monitoring occasion, or an intra-group index of the candidate location of the PDCCH monitoring occasion, and S' represents a maximum value of K', or the number or maximum number of PDCCH monitoring occasions that are actually transmitted.

Further, the association relationship between K' and K may be transmitted to the terminal or predefined.

Further, the association relationship between K' and K may include: K' is an intra-QCL-subgroup index of the synchronization signal block with an index of K.

Further, S' being the number or maximum number of PDCCH monitoring occasions that are actually transmitted may be transmitted to the terminal or predefined.

Further, x representing the inter-group index of the candidate position of the PDCCH monitoring occasion is an integer, and $0 \le x < X$, and X is transmitted to the terminal or is predefined.

Further, S'×X PDCCH monitoring occasions may constitute a PDCCH monitoring occasion window or a paging occasion.

In S12, determining an intra-QCL-subgroup index of the synchronization signal block with the index of K.

Further, said determining an intra-QCL-subgroup index of the synchronization signal block with an index of K may include: obtaining, based on the predefined association relationship, an index of the synchronization signal block with the index of K in a synchronization signal block subgroup where the synchronization signal block with an index of K is located in and having QCL relationship, that is synchronization signal blocks in a synchronization signal block subgroup have QCL relationship.

Furthermore, the predefined association relationship may be represented as $K=P\times q+m$;

P is the number of synchronization signal blocks in the QCL subgroup corresponding to the synchronization signal block, q represents an inter-QCL-group index corresponding to the synchronization signal block, and M represents an intra-QCL-subgroup of the synchronization signal block.

The q may be an integer, and $0 \le q < Q$. The Q may be a positive integer, and Q may be received from the base station or predefined. Q may represent the number of non-QCLed synchronization signal blocks.

Based on the above association relationship, K may be calculated from M. On the other hand, M may be derived from K based on the above association relationship. M may be obtained by performing a modulo P operation on K, or by dividing P into K to obtain a remainder.

Furthermore, the predefined association relationship may be represented as $i1=S\times c+K=S\times c+P\times q+M$;

i1 represents an index of a candidate position of the synchronization signal block, S represents the maximum value of K, or the number of synchronization signal blocks in the synchronization signal block group, or the number or maximum number of synchronization signal blocks that are actually transmitted, and c represents an inter-group index of the candidate position of the synchronization signal block.

Furthermore, c may be an integer, and $0 \le c < C$. The C may be transmitted to the terminal or predefined.

Based on the above association relationship, K may be calculated from M. On the other hand, M may be derived from it based on the above association relationship. M may be obtained by performing a modulo P operation on i1, or by dividing P into i1 to obtain a remainder. Generally, S is an integer multiple of P, that is, the number or maximum number of synchronization signal blocks that are actually transmitted is an integer multiple of the number of synchronization signal blocks in the QCL subgroup corresponding to the synchronization signal block. Therefore, the modulo P operation performed on it or the operation of dividing P into it to obtain the remainder, is equivalent to the modulo P operation performed on $P\times q+M$ (that is, K), or the operation of dividing P into K to obtain the remainder.

In S23, determining a redundant version of a PDSCH scheduled by the i-th PDCCH based on the intra-QCL-subgroup index.

In an embodiment of the present disclosure, based on the predefined association relationship between the PDCCH monitoring occasion and the synchronization signal block, it may be acquired, when a synchronization signal block with an index of K is transmitted, an i-th PDCCH monitoring occasion corresponding to the synchronization signal block with an index of K based on the predefined association relationship, thereby effectively improving the reception performance and efficiency of broadcast-type information when the broadcast-type information is transmitted through a wide beam or in an omnidirectional manner.

Further, there is a QCL relationship between the synchronization signal block with an index of K and a PDCCH monitoring occasion with an index of a candidate position being equal to i.

Further, the PDCCH monitoring occasion may include: monitoring occasion of Type2-PDCCH or paging PDCCH or Type0-PDCCH or Type0A-PDCCH or Type1-PDCCH.

Further, the PDCCH monitoring occasion may include a monitoring occasion of any common control channel or a PDCCH monitoring occasion corresponding to a common search space.

In a specific implementation, more details about the method for determining the PDCCH monitoring occasion shown in FIG. 2 may be made reference with the description of FIG. 1, and will not be repeated here.

Figure 3:
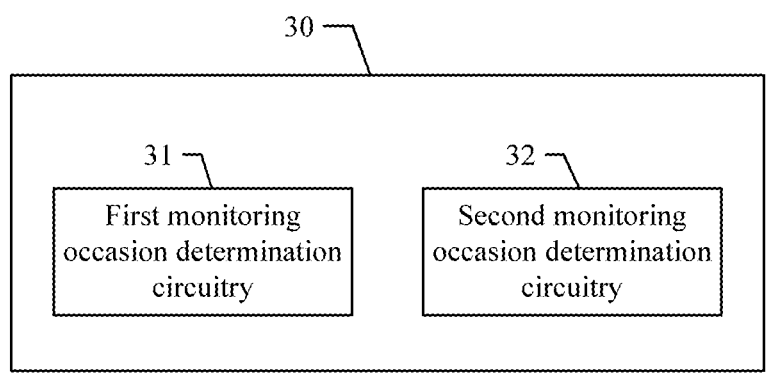
FIG. 3 is a schematic structural diagram of an apparatus for determining PDCCH monitoring occasion according to an embodiment of the present disclosure.

Referring to FIG. 3, FIG. 3 is a schematic structural diagram of an apparatus for determining PDCCH monitoring occasion according to an embodiment of the present disclosure.

The apparatus 30 for determining PDCCH monitoring occasion may include a first monitoring occasion determination circuitry 31, and may also include a second monitoring occasion determination circuitry 32.

Specifically, the first monitoring occasion determination circuitry 31 may be applied to a terminal side, and is configured to: when a synchronization signal block with an index of K is detected, acquire an i-th PDCCH monitoring occasion corresponding to the synchronization signal block with the index of K based on a predefined association relationship. The PDCCH monitoring occasion has the predefined association relationship with the synchronization signal block, i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block.

Specifically, the second monitoring occasion determination circuitry 32 may be applied to a base station, and is configured to: when a synchronization signal block with an index of K is transmitted, acquire an i-th PDCCH monitoring occasion corresponding to a QCL subgroup where the synchronization signal block with the index of K is located in based on a predefined association relationship. The PDCCH monitoring occasion has the predefined association relationship with the synchronization signal block, i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block.

Principles, specific implementations, and beneficial effects of the apparatus for determining PDCCH monitoring occasion may be made reference with the foregoing description and related description of the method for determining PDCCH monitoring occasion shown in FIG. 1 to FIG. 2, and will not be repeated here.

In an embodiment of the present disclosure, a storage medium having computer instructions stored therein is provided, wherein once the computer instructions are executed, the above method as shown in FIG. 1 or FIG. 2 is performed. In some embodiment, the storage medium may be a computer-readable storage medium, include a nonvolatile or non-transitory memory or the like. The storage medium includes an optical disk, a mechanical hard disk, a solid state hard disk or the like.

In an embodiment of the present disclosure, a terminal including a memory and a processor is provided, wherein the memory has computer instructions stored therein, and when the processor executes the computer instructions, the above method for determining PDCCH monitoring occasion shown in FIG. 1 is performed.

A terminal (for example, a sending terminal and/or a receiving terminal) in the embodiments of the present disclosure may refer to various forms of User Equipment (UE), access terminals, user units, user stations, Mobile Stations (MS), remote stations, remote terminals, mobile devices, user terminals, terminal equipments, wireless communication devices, user agents or user devices. The terminal device may also be a cellular phone, a cordless phone, a Session Initiation Protocol (SIP) phone, a Wireless Local Loop (WLL) station, a Personal Digital Assistant (PDA), a handheld device with the wireless communication function, a computing device or other processing devices connected to a wireless modem, vehicle equipments, wearable devices, terminal devices in the future 5G network, terminal devices in the future Public Land Mobile Network (PLMN), and the like, which is not limited in embodiments of the present disclosure.

Further, in the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

Further, the memory in the embodiments of the present disclosure may be either volatile memory or nonvolatile memory, or may include both volatile and nonvolatile memories. The nonvolatile memory may be a ROM, a Programmable ROM (PROM), an Erasable PROM (EPROM), an electrically Erasable EPROM (EEPROM), or a flash memory. The volatile memory may be a RAM which functions as an external cache. By way of example but not limitation, various forms of random access memory are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchlink DRAM (SLDRAM), and Direct Rambus RAM (DR RAM).

In an embodiment of the present disclosure, a base station including a memory and a processor is provided, wherein the memory has computer instructions stored therein, and when the processor executes the computer instructions, the above method for determining PDCCH monitoring occasion shown in FIG. 2 is performed.

The base station (base station, BS), which may also be referred to as base station equipment, is a device deployed on a Radio Access Network (RAN) to provide wireless communication functions. For example, a device that provides base station functions in a 2G network includes a Base Transceiver Station (base transceiver station, BTS), a device that provides base station functions in a 3G network includes a NodeB (NodeB), a device that provides base station functions in a 4G network includes an evolved NodeB (evolved NodeB, eNB), a device that provides base station functions in a Wireless Local Area Network (wireless local area network, WLAN) is an Access Point (access point, AP), and a device that provides base station functions in a 5G new radio (New Radio, NR) is a gNB and a ng-eNB (ng-eNB). The NR technology is applied for communication between gNB and the terminal, and the E-UTRA (Evolved Universal Terrestrial Radio Access) technology is applied for communication between ng-eNB and the terminal. Both of gNB and ng-eNB can be connected to the 5G core network. The base station in the embodiment of the present disclosure also includes a device that provides base station functions in a new communication system in the future.

A base station controller in an embodiment of the present disclosure is an apparatus for managing a base station, such as a Base Station Controller (base station controller, BSC) in a 2G network, a Radio Network Controller (radio network controller, RNC) in a 3G network, and may also refer to a device that controls and manages the base station in the new communication system in the future.

The network at a network side in the embodiment of the present disclosure refers to a communication network that provides communication services for a terminal, and includes a base station of the wireless access network, and may also include a base station controller of the wireless access network, and may also include a device at the core network side.

Embodiments of the present disclosure are applicable for a 5G communication system, a 4G communication system, a 3G communication system, and various communication systems in the future, such as 6G and 7G.

Embodiments of the present disclosure are also applicable for different network architectures, including but not limited to a relay network architecture, a dual link architecture, and a Vehicle-to-Everything (vehicle-to-everything communication) architecture, and other architecture.

The "a plurality of" used in embodiments of the present disclosure refers to two or more than two. It can be understood that, in various embodiments of the present disclosure, the sequence numbers of the above-mentioned processes as shown in FIG. 1 to FIG. 2 do not indicate the execution orders. The execution order of the above-mentioned processes should be determined based on its function and inherent logic, and should not be any limitation to the implementation process of the embodiments of the present disclosure.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for determining Physical Downlink Control Channel (PDCCH) monitoring occasion, comprising:
    acquiring an i-th PDCCH monitoring occasion corresponding to the synchronization signal block with the index of K based on a predefined association relationship, in response to detecting a synchronization signal block with an index of K, wherein the PDCCH monitoring occasion has the predefined association relationship with the synchronization signal block, wherein i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block;
    wherein the method further comprises:
        determining an intra-Quasi Co-Location (QCL)-subgroup index of the synchronization signal block with the index of K where the synchronization signal block with the index of K is located; and
        determining a redundant version of a Physical Downlink Shared Channel (PDSCH) scheduled by the i-th PDCCH based on the intra-QCL-subgroup index.

2. The method according to claim 1, wherein said determining an intra-QCL-subgroup index of the synchronization signal block with the index of K where the synchronization signal block with the index of K is located comprises:
    acquiring an intra-QCL-subgroup index of the synchronization signal block with the index of K in a synchronization signal block subgroup where the synchronization signal block with the index of K is located and having QCL relationship, based on the predefined association relationship.

3. The method according to claim 2, wherein the predefined association relationship is represented as $i1=S\times c1+K$;
    wherein, i1 represents an index of the candidate position of the synchronization signal block, S represents a maximum value of K, or the number of synchronization signal blocks in a synchronization signal block group, or the number or maximum number of synchronization signal blocks that are actually transmitted, and c1 represents an inter-group index of the candidate position of the synchronization signal block.

4. The method according to claim 3, wherein, c1 is an integer, and $0\leq c1<C$, wherein the C represents a maximum value of c1, and is received from a base station or is predefined.

5. The method according to claim 2, wherein the predefined association relationship is represented as $K=P\times q1+M$;
    wherein, P represents the number of synchronization signal blocks in the QCL subgroup of the synchronization signal block, q1 represents an inter-QCL-subgroup index of the synchronization signal block, and M represents an intra-QCL-subgroup index of the synchronization signal block.

6. The method according to claim 1, wherein, the predefined association relationship is represented as $i=S\times x1+K$;
    wherein, x1 represents an inter-group index of the candidate position of the PDCCH monitoring occasion, and S represents a maximum value of K, or the number of synchronization signal blocks in a synchronization signal block group, or the number or maximum number of synchronization signal blocks that are actually transmitted.

7. The method according to claim 6, wherein, S, being the number or maximum number of synchronization signal blocks that are actually transmitted, is received from a base station or is predefined.

8. The method according to claim 1, wherein, the predefined association relationship is represented as $i=S'\times x1+K'$;
    wherein, x1 represents an inter-group index of the candidate position of the PDCCH monitoring occasion, K' represents an index of the PDCCH monitoring occasion, or a beam index of the PDCCH monitoring occasion, or an intra-index of the candidate location of the PDCCH monitoring occasion, and S' represents a maximum value of K', or the number or maximum number of PDCCH monitoring occasions that are actually transmitted.

9. The method according to claim 8, wherein an association relationship between K' and K is received from a base station or is predefined.

10. The method according to claim 9, wherein the association relationship between K' and K comprises: K' is an intra-QCL-subgroup index of the synchronization signal block with the index of K.

11. The method according to claim 8, wherein S' is received from a base station or is predefined, wherein S' is the number or the maximum number of PDCCH monitoring occasions that are actually transmitted.

12. The method according to claim 6, wherein the inter-group index x1 of the candidate position of the PDCCH monitoring occasion is an integer, and 0≤x1<X, wherein X represents a maximum value of x1, and is received from a base station or is predefined.

13. The method according to claim 12, wherein the S×X PDCCH monitoring occasions constitute a PDCCH monitoring occasion window or a paging occasion.

14. The method according to claim 11, wherein the S'×X PDCCH monitoring occasions constitute a PDCCH monitoring occasion window or a paging occasion.

15. The method according to claim 1, wherein the synchronization signal block with the index of K and a PDCCH monitoring occasion with an index of a candidate position being equal to i have QCL relationship.

16. The method according to claim 1, wherein the PDCCH monitoring occasion comprises: monitoring occasion of Type2-PDCCH or paging PDCCH or Type0-PDCCH or Type0A-PDCCH or Type1-PDCCH.

17. An apparatus for determining Physical Downlink Control Channel (PDCCH) monitoring occasion, comprising:
a first monitoring occasion determination circuitry, configured to: acquire an i-th PDCCH monitoring occasion corresponding to the synchronization signal block with the index of K based on a predefined association relationship, in response to detecting a synchronization signal block with an index of K, wherein the PDCCH monitoring occasion has the predefined association relationship with the synchronization signal block, wherein i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block; and
a second circuitry configured to: determine an intra-Quasi Co-Location (QCL)-subgroup index of the synchronization signal block with the index of K where the synchronization signal block with the index of K is located; and determine a redundant version of a Physical Downlink Shared Channel (PDSCH) scheduled by the i-th PDCCH based on the intra-QCL-subgroup index.

18. A non-transitory storage medium storing one or more programs, the one or more programs comprising computer instructions, which, when executed by a processor, cause the processor to:
acquire an i-th Physical Downlink Control Channel (PDCCH) monitoring occasion corresponding to the synchronization signal block with the index of K based on a predefined association relationship, in response to detecting a synchronization signal block with an index of K, wherein the PDCCH monitoring occasion has the predefined association relationship with the synchronization signal block, wherein i represents an index of a candidate position of the PDCCH monitoring occasion, K represents an index of the synchronization signal block, or a beam index of the synchronization signal block, or an intra-group index of the synchronization signal block, or an intra-group index of a candidate position of the synchronization signal block;
determine an intra-Quasi Co-Location (QCL)-subgroup index of the synchronization signal block with the index of K where the synchronization signal block with the index of K is located; and
determine a redundant version of a Physical Downlink Shared Channel (PDSCH) scheduled by the i-th PDCCH based on the intra-QCL-subgroup index.

19. The method according to claim 8, wherein the inter-group index x1 of the candidate position of the PDCCH monitoring occasion is an integer, and 0≤x1<X, wherein X is received from a base station or is predefined.

* * * * *